(12) United States Patent
Redden et al.

(10) Patent No.: US 12,109,573 B2
(45) Date of Patent: Oct. 8, 2024

(54) METHOD AND SYSTEM FOR ASH RECLAMATION

(71) Applicant: ASHCOR TECHNOLOGIES LTD., Calgary (CA)

(72) Inventors: Dwight Redden, Calgary (CA); Darryl Stebner, Lacombe (CA); Jesse Waddell, Calgary (CA); Daryl Walker, Calgary (CA)

(73) Assignee: ASHCOR TECHNOLOGIES LTD., Calgary (CA)

( * ) Notice: Subject to any disclaimer, the term of this patent is extended or adjusted under 35 U.S.C. 154(b) by 268 days.

(21) Appl. No.: 17/765,782

(22) PCT Filed: Mar. 24, 2020

(86) PCT No.: PCT/CA2020/050384
§ 371 (c)(1),
(2) Date: Mar. 31, 2022

(87) PCT Pub. No.: WO2021/077202
PCT Pub. Date: Apr. 29, 2021

(65) Prior Publication Data
US 2022/0355309 A1 Nov. 10, 2022

Related U.S. Application Data

(60) Provisional application No. 62/924,055, filed on Oct. 21, 2019.

(51) Int. Cl.
*B02C 23/12* (2006.01)
*B02C 15/00* (2006.01)
*B02C 23/02* (2006.01)

(52) U.S. Cl.
CPC ............. *B02C 23/12* (2013.01); *B02C 23/02* (2013.01); *B02C 2015/002* (2013.01); *B02C 2201/06* (2013.01)

(58) Field of Classification Search
CPC ........ Y02W 30/91; B02C 23/10; B02C 23/12; B02C 2201/06
See application file for complete search history.

(56) References Cited

U.S. PATENT DOCUMENTS

| 4,155,313 A | 5/1979 | Moss |
| 4,338,188 A | 7/1982 | Guerre |

(Continued)

FOREIGN PATENT DOCUMENTS

| CA | 2374906 A1 | 10/2001 |
| CA | 2572893 A1 | 1/2006 |

(Continued)

OTHER PUBLICATIONS

Savannah Cooper, Recycling and reusing coal ash, World Coal, Jan. 20, 2015, 2 pages.

(Continued)

*Primary Examiner* — Bobby Yeonjin Kim
(74) *Attorney, Agent, or Firm* — Bennett Jones LLP

(57) ABSTRACT

A method and system for coal ash reclamation from a land fill, the system comprising: a harvester; a screen for screening non-ash material from ash collected by the harvester; a dryer for drying raw ash thereby creating dried coal ash and fine particulate ash; an exhaust pipe to direct the ash to a dust collector; a crusher for crushing the dried ash; a classifier for classifying the crushed dried ash; and a storage container for storage. The method comprising: harvesting raw coal ash from a land fill; screening the raw coal ash to remove oversize materials; drying the screened ash to remove water; crushing the stream of dried ash; classifying the crushed ash into fine particulate ash and large particulate ash, the second stream being directed for further crushing; streams of fine particulate ash being cooled; and storing the fine particulate ash.

8 Claims, 2 Drawing Sheets

(56) References Cited

U.S. PATENT DOCUMENTS

| | | | |
|---|---|---|---|
| 8,234,986 | B2 | 8/2012 | Knowles et al. |
| 8,696,770 | B2 | 4/2014 | Jeong |
| 2011/0173878 | A1* | 7/2011 | Jeong .................. C04B 18/027 |
| | | | 44/620 |
| 2013/0276835 | A1* | 10/2013 | Jepsen .................. C04B 18/08 |
| | | | 134/19 |

FOREIGN PATENT DOCUMENTS

| | | |
|---|---|---|
| CN | 100586590 | 2/2010 |
| CN | 104907152 | 9/2015 |
| CN | 107233992 | 10/2017 |
| CN | 112517152 A | 3/2019 |
| CN | 108715520 | 3/2022 |
| JP | H094835 | 1/1997 |
| JP | 2005262056 | 9/2005 |
| KR | 101243094 B1 | 3/2013 |
| KR | 101814123 B1 | 1/2018 |
| KR | 102159755 | 9/2020 |
| WO | WO-2017074201 A1 * | 5/2017 |

OTHER PUBLICATIONS

David Mayfield and Ari Lewis, Coal Ash Recycling: A Rare Opportunity, Waste Management World, Oct. 14, 2013, 6 pages.

FLSmidth USA Inc., One Source, Minerals Gas Suspension Calciners (GSC), 2015, 4 Pages, USA.

A3001-13 Cementitious materials for use in concrete, Oct. 2013, 40 pages, Mississauga, Ontario, Canada, CSA Group.

https://www.jiutian-dryer.com/product/coal/43.html?gclid=CjwKCAiA-9uNBhBTEiwAN3IINBwjn1U1CpUkB_xZ_U-u8m-adO8Uq4Z1dKSauqTAY9p3lgyZdQCbZBoCyLAQAvD_BwE.

http://www.hongjigroup.com/product/Rotary%20Dryer.html.

http://www.hongjigroup.com/product/Circular_Vibrating_Screen.html.

https://www.tianlienergy.com/products/Rotary_Dryer.html?gclid=CjwKCAiA-9uNBhBTEiwAN3IINMAIEYIx805rfTYU-rfxFPdlqCyMCYahgGbvx-kMacIBgyyN7TrJzhoCUKAQAvD_BwE.

https://www.process-heating.com/articles/91374-drying-processes-for-coal-ash-reuse, 2022.

Scott Ziegler, Cost-Effective Ash Beneficiation Technology, Charah Solutions Inc, Louisville, KY, USA, 2019, 5 pages.

Advancing Concrete Pavement Technology Solutions, Use of Harvested Fly Ash in Highway Infrastructure, Tech Brief, National Concrete Pavement Technology Center, Iowa State University, Iowa, USA, Updated May 2021 (Sep. 2020), 11 pages.

https://www.worldcoal.com/power/28082014/putting-coal-ash-to-good-use-1260/, Aug. 28, 2014.

P.D. Grover & S.K. Mishra, Biomass Briquetting: Technology and Practices, Regional Wood Energy Development Programme in Asia, Apr. 1996, 48 pages, Filed Document No. 46, Food and Agriculture Organization of the United Nations, Bangkok.

* cited by examiner

METHOD AND SYSTEM FOR ASH RECLAMATION

BENEFIT OF EARLIER APPLICATIONS

This application claims priority from U.S. provisional application 62/924,055, filed Oct. 21, 2019.

FIELD

The present invention relates generally to ash reclamation, and, in particular, the invention relates to the reclamation of coal fire ash deposits.

BACKGROUND

The burning of coal generates coal ash, which includes fine ash, also known as fly ash; and oversized ash, also known as bottom ash.

Fly ash is a light form of coal ash that floats into the exhaust stacks. It is collected by exhaust treatment and has the consistency of dry flour. Collected fly ash is sold to concrete suppliers, oil well cementing service providers, building material manufacturers and others.

Bottom ash is the heavier portion of coal ash that remains in the boiler after combustion. Bottom ash accumulates on the sides of the boiler. It is removed by high pressure steam blowers, water jetting, etc. Bottom ash, once removed, has a consistency of aggregate and is often wet. It has little value and is often conveyed to land fill.

The world has significant land fill sites resulting from accumulations of coal ash. These sites contain mostly bottom ash but sometimes fly ash is also dumped at these sites. Some land fill sites in western Canada contain about equal quantities of fly ash and bottom ash. The deposits can therefore contain intermixed pockets of fine, fly ash and granular, bottom ash. Regardless, regular watering for dust mitigation and weather causes the water content of the coal fired ash deposits to be quite high, such as 8-20% by volume.

Ash reclamation methods and operations are required to reduce the volume of coal ash land fill.

SUMMARY

In accordance with one aspect of the present invention, there is provided a system for coal ash reclamation from a land fill, the system comprising: a harvester for collecting raw coal ash from the land fill; a screen for screening non-ash material from raw coal ash collected by the harvester; a dryer for drying the raw coal ash thereby creating dried coal ash and fine particulate ash; an exhaust pipe to direct the fine particulate ash to a dust collector; a crusher for crushing the dried coal ash and thereby creating crushed dried ash and fine particulate ash; a classifier for classifying the crushed dried ash into large particulate ash and fine particulate ash; and the dust collector configured for receiving the fine particulate ash from the exhaust pipe, and collecting the fine particulate ash from air; a cooling system for cooling the fine particulate ash; and a storage container for storage of the collected fine particulate ash.

In accordance with yet another aspect, there is provided a method for reclaiming coal ash from a land fill, the method comprising: harvesting raw coal ash from a land fill; screening the raw coal ash to remove oversize materials thereby creating screened ash; drying the screened ash to reduce the water content, creating a stream of dried coal ash and a first stream of fine particulate ash; crushing the stream of dried coal ash to produce crushed dried ash; a cooling system for controlling the temperature of the crusher and its contents; classifying the crushed dried ash into a second stream of fine particulate ash and a stream of large particulate ash, the second stream being directed for further crushing; a cooling system for cooling the fine particulate ash; and storing the fine particulate ash.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the claim scope of the present invention. Accordingly the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the Figures, wherein.

DETAILED DESCRIPTION OF VARIOUS EMBODIMENTS

Figure 1:
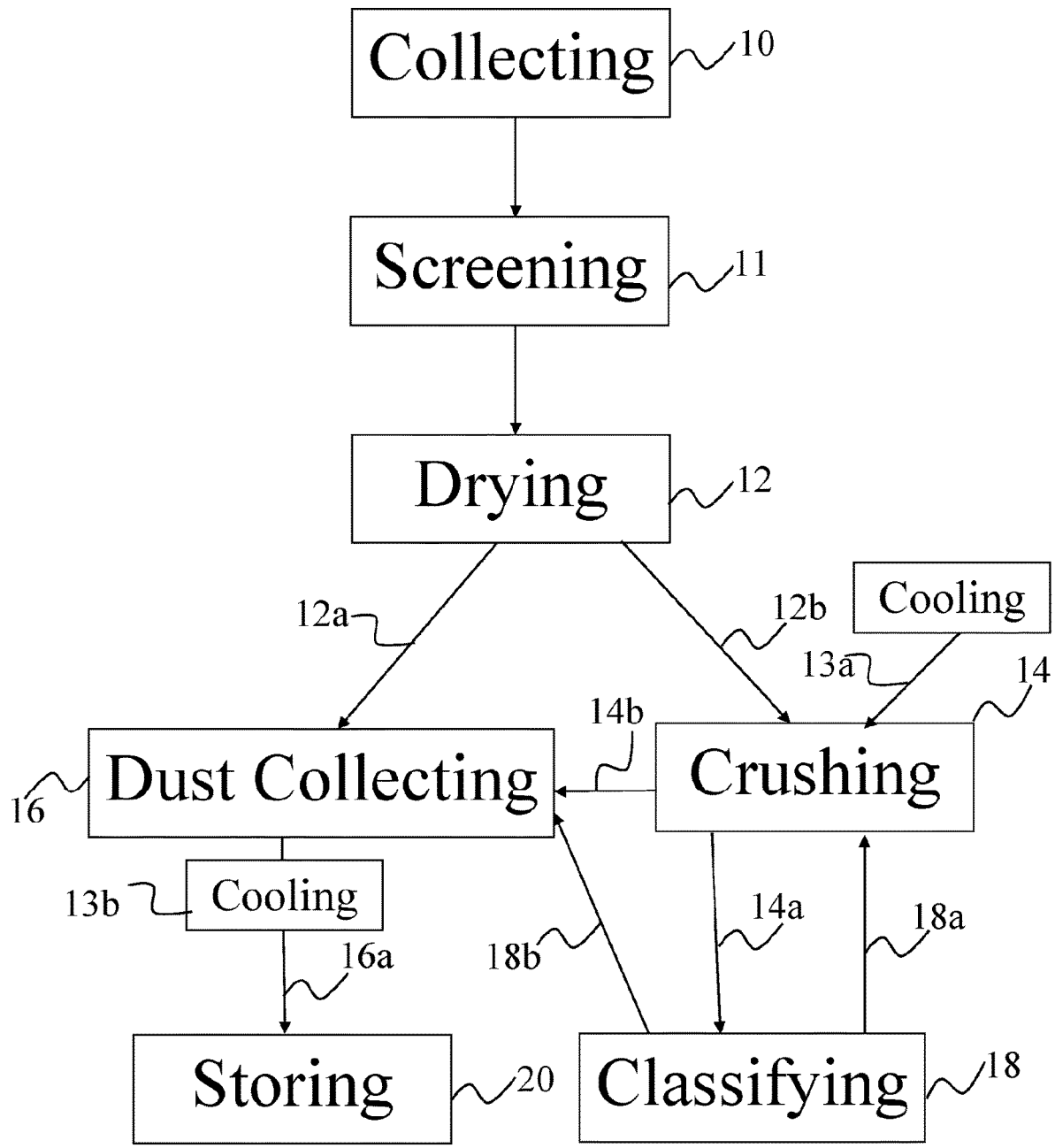
FIG. 1 is a flow diagram for an embodiment of a method for reclaiming coal ash according to the invention.

The description that follows, and the embodiments described therein, is provided by way of illustration of an example, or examples, of particular embodiments of the principles of various aspects of the present invention. These examples are provided for the purposes of explanation, and not of limitation, of those principles and of the invention in its various aspects. In the description, similar parts are marked throughout the specification and the drawings with the same respective reference numerals. The drawings are not necessarily to scale.

Reference will now be made to FIG. 1, which is a flow diagram for an embodiment of a method for reclaiming coal ash according to the invention.

In one embodiment, the method includes harvesting 10 raw coal ash, including fly ash and bottom ash, from a land fill. The land fill often has a hardened surface. The raw coal ash can be harvested by digging it out of the land fill. In one embodiment, the hardened land fill surface can be chewed up such that the resulting raw cola ash is substantially already sized for processing. The method further includes screening 11 the raw coal ash to remove oversize materials. The screened ash is then dried 12 to reduce its water content to create a first stream of fine particulate ash 12a and a dried coal ash stream 12b. The method includes cooling 13a, 13b the components of the invention such as the crusher and/or the ash material. The method also includes crushing 14 the dried coal ash stream to reduce the particulate size and to create a milled stream of ash 14a, and a second stream of fine particulate ash 14b, and then classifying 18 the milled stream of ash by size to generate a stream of oversize particulate ash 18a and a third stream of fine particulate ash 18b. The oversize stream 18a is recycled to the crushing step 14. The streams of fine particulate ash may be directed to dust collecting 16 to separate the fine particulate ash from air and the collected ash can then be stored 20. The fine particulate ash has material characteristics of fly ash. The CSA Group indicates that fly ash has a fineness of maximum 34% retained on a 45 μm sieve, a moisture content of less than 3% by volume, and is capable of being carried from the combustion chamber of a furnace by exhaust gases.

A cooling system 310 may be provided to control the temperature of the crusher and its contents. Equipment may deteriorate or fail in high-temperature conditions, for example if components reach temperatures above 120-132 degrees Celsius. The cooling system 310 may cool 13 ash and/or one or more other components of the embodiment to keep temperatures below 120-132 degrees Celsius. Transport trucks may have temperature limitations for their cargo. For example some transport trucks may have a maximum temperature of 50-70 degrees Celsius. A cooling system 475 may operate to reduce the temperature of ash to below 50-70 degrees Celsius so that it can be transported by a transport truck. The streams of fine particulate ash may be cooled. Cooling systems 310, 475 may include one or more of: (i) a bearings glycol and air to glycol cooling system; (ii) one or more of air blowers, vents, and fans to increase movement of air above and around components such as one or more of the crusher, screen, classifier, dust collector, and storage container. In one embodiment, there is an air blower configured to blow air over the crusher. The air cooling system may be pneumatically supported. The cooling systems, for example cooling system 475, may include pneumatic piping, such as an externally finned heat exchange pipe, which reduces temperatures of ash and other material passing therethrough. In one embodiment, cooling system 475 includes pneumatic piping between the dust collector 450 and the storage container 500. It will be appreciated that depending on environmental and other conditions, such as the climate, and volume of material being processed, the cooling systems may operate at a reduced capacity while still maintaining components and ash material below required temperatures. For example, in cold winter weather, a heat exchange pipe may be sufficient to maintain ash below required temperatures. In warmer summer weather, a heat exchange pipe and air blowers may be used.

Typical water content of raw coal ash before drying may be high, such as 18-20% water by volume. To be used to create cement, the water content must be reduced to 3% or lower. In testing, one embodiment of the present invention reduced the water content to below 1% in the fine particulate ash. Reducing the water content as low as possible is advantageous for various reasons including reducing weight and volume for storage and transport.

Figure 2:
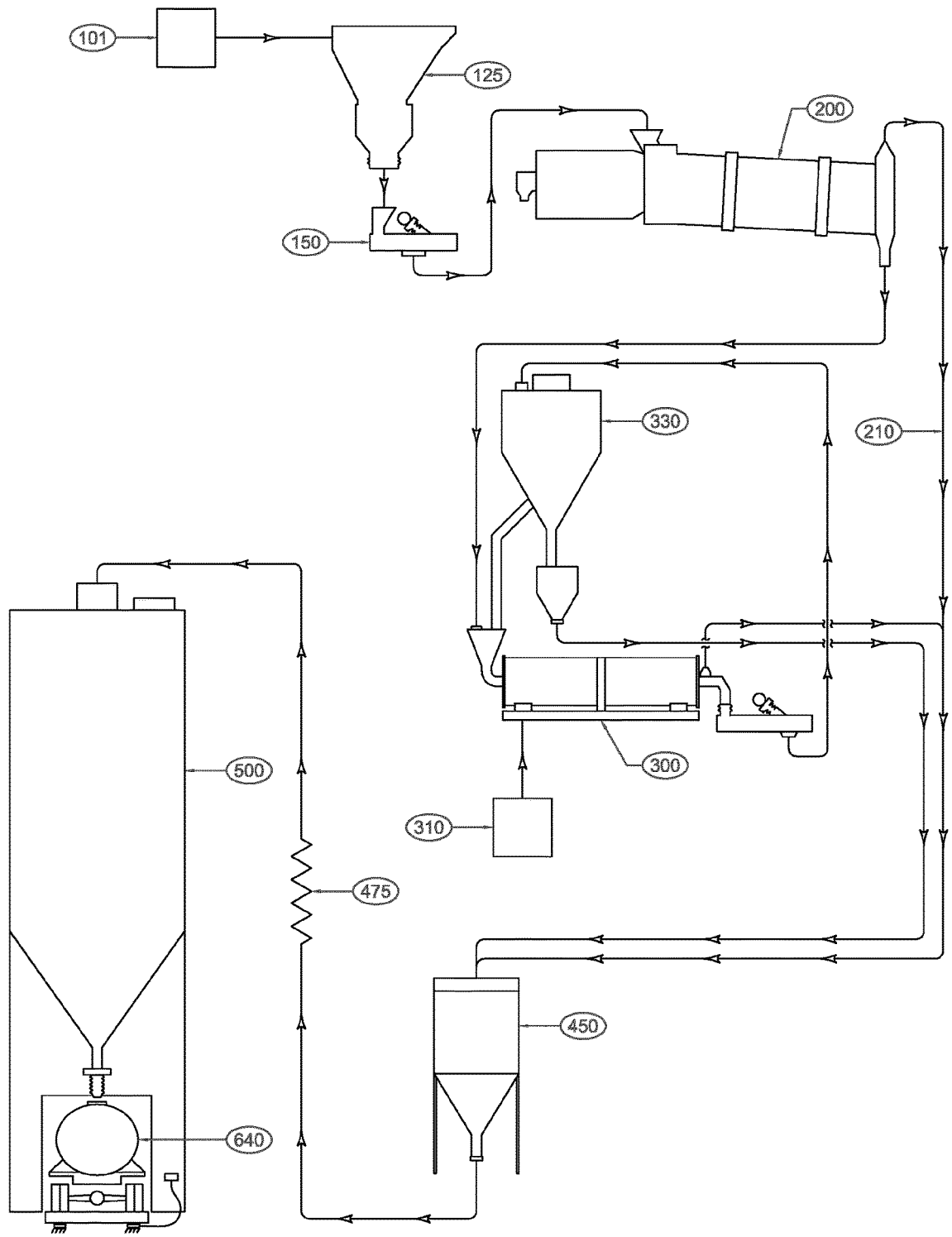
FIG. 2 is a diagram of a system for coal ash reclamation according to the present invention.

Reference will now be made to FIG. 2, which is a diagram of a system for coal ash reclamation according to the present invention.

In one embodiment, the system includes: a harvester 101, a hopper 125, a screen 150, a dryer 200, an exhaust pipe 210, a cooler 310, a crusher 300, a classifier 330, a dust collector 450, a cooler 475, a storage container 500, and a trucking facility 640.

In use, an operator uses the system as described in this paragraph to remediate raw coal ash waste into a useful fine particulate ash product suitable for use in concrete or other products. The operator uses the harvester to collect raw coal ash from a land fill. The raw coal ash is harvested and broken into smaller chunks of less than 10 cm, and possibly less than 5 cm, in diameter.

The operator can deposit the collected raw coal ash, for example into a hopper. The material may be communicated from the hopper onto the screen, which may be a vibrating screen, configured to separate any non-ash material from the raw coal ash. Material that passes through the screen may be directed to the dryer. Material that does not pass through the screen may be disposed of, for example by being removed from the screen and directed to a waste container. The screen may be positioned between the hopper and the dryer. The screen is in communication with the dryer, which may be a rotary drum. The dryer is configured to receive the raw coal ash that passes through the screen. The dryer reduces the water content of the raw coal ash to create dried coal ash. The drying process can create fine particulate ash, which has the material characteristics such that it is capable of being entrained in the air flow exiting the dryer and it may be directed to the dust collector by the exhaust pipe.

The dryer is coupled to the crusher, either directly or by a conveyor. The system is configured to deposit the dried coal ash into the crusher. The crusher reduces the particulate size of the dried coal ash and thereby converts the dried coal ash into a stream of milled ash. The crushing process can also create fine particulate ash, which has the material characteristics such that it is capable of being entrained in an air flow exiting the crusher and it may be directed to the dust collector by the exhaust pipe.

The crusher is coupled to the classifier, either directly or by a conveyor. The system is configured to deposit the milled ash into the classifier. The classifier classifies the milled ash into two types of ash, being fine particulate ash and oversized ash. The classifier is also in communication with the dust collector and deposits the fine particulate ash into the dust collector. The classifier directs oversized ash back to the crusher for further processing.

The dust collector collects the fine particulate ash and may direct the fine particulate ash to the cooling system, and may direct the fine particulate ash to the container for storage. The fine particulate ash has the material characteristics of fly ash and may be shipped, as by trucking 640, to a cement facility.

In one embodiment, the collecting/harvesting step 10 may include analysis of the material to be harvested. For example, analysis may include one or more of: (i) determining the depth and/or width of the ash deposit, performing borehole analysis, and/or performing 3D mapping to ensure side and bottom boundaries of the deposit are known. Such analysis may avoid processing non-ash material. In one embodiment, after performing such analysis, collection may be performed within 0.5 m-2 m from the boundary defined between the deposit of raw ash material and non-ash material. In other words, only that material at least 0.5 m-2 m inside such boundary may be collected and processed. The collecting/harvesting step 10 may also include visually observing, for example at the screen 150 or through windows in the piping, the various streams of material being processed to ensure that such material is ash deposit.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the scope of the claims. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

We claim:

1. A system for coal ash reclamation from a land fill, the system comprising:
    a harvester for collecting raw coal ash from the land fill;
    a screen for screening non-ash material from raw coal ash collected by the harvester;
    a dryer, being a rotary drum dryer, for drying the raw coal ash thereby creating dried coal ash and fine particulate ash;
    an exhaust pipe to direct the fine particulate ash to a dust collector;
    a crusher for crushing the dried coal ash and thereby creating crushed dried ash and fine particulate ash;
    a classifier for classifying the crushed dried ash into large particulate ash and fine particulate ash; and
    the dust collector configured for
        receiving the fine particulate ash from the dryer, the crusher, and the classifier, via the exhaust pipe, and collecting the fine particulate ash from air; and
    a storage container for storage of the collected fine particulate ash.

2. The system of claim 1, further comprising a cooling system for controlling the temperature of the crusher, wherein the dust collector is further configured for cooling the collected fine particulate ash.

3. The system of claim 1, wherein a receiving hopper is configured to communicate material to the screen.

4. The system of claim 1, wherein the screen is a vibrating screen.

5. The system of claim 1, wherein the crusher is a ball mill.

6. The system of claim 1, wherein the storage container is a hopper.

7. A method for reclaiming coal ash from a land fill, the method comprising:
    harvesting raw coal ash from a land fill;
    screening the raw coal ash to remove oversize materials thereby creating screened ash;
    drying, using a rotary drum dryer, the screened ash to reduce the water content, creating a stream of dried coal ash and a first stream of fine particulate ash;
    crushing the stream of dried coal ash to produce crushed dried ash;
    classifying the crushed dried ash into a second stream of fine particulate ash and a stream of large particulate ash, the stream of large particulate ash being directed for further crushing; and
    storing the fine particulate ash.

8. The method of claim 7, further comprising cooling one or more of the screened ash, the stream of dried coal ash, the first stream of fine particulate ash, the crushed dried ash, the second stream of fine particulate ash, the stream of large particulate ash, and the fine particulate ash.

* * * * *